(12) United States Patent
Yamauchi et al.

(10) Patent No.: US 7,538,919 B2
(45) Date of Patent: May 26, 2009

(54) THREE-DIMENSIONAL HOLOGRAM PROCESS WITH OVERT ANTI-COUNTERFEIT SECURITY USING FIRST OBJECT LIGHT, SECOND OBJECT LIGHT, AND REFERENCE LIGHT

(75) Inventors: Tsuyoshi Yamauchi, Tokyo (JP); Masachika Watanabe, Tokyo (JP); Tomoko Kumasawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 115 days.

(21) Appl. No.: 11/483,562

(22) Filed: Jul. 11, 2006

(65) Prior Publication Data
US 2007/0008596 A1    Jan. 11, 2007

(30) Foreign Application Priority Data
Jul. 11, 2005 (JP) ............................. 2005-201904
Jun. 2, 2006 (JP) ............................. 2006-154233

(51) Int. Cl.
*G03H 1/00* (2006.01)
(52) U.S. Cl. .......................................... 359/2; 283/86
(58) Field of Classification Search ............... 359/10, 359/11, 15, 22, 28, 30, 31, 35, 2; 283/86
See application file for complete search history.

(56) References Cited

U.S. PATENT DOCUMENTS 3,610,723 A * 10/1971 Spitz .......................... 365/125
3,623,788 A    11/1971 Snow et al.
3,778,128 A * 12/1973 Hannan ....................... 380/54
5,886,798 A *  3/1999 Staub et al. ..................... 359/2
6,873,443 B1   3/2005 Joubert et al.
2003/0030858 A1  2/2003 Kodama
2004/0121241 A1  6/2004 Kodama

FOREIGN PATENT DOCUMENTS

| EP | 1 004 946 A1 | 5/2000 |
| EP | 1004946 A1 | 5/2000 |
| EP | 1 316 915 A1 | 6/2003 |
| EP | 1316915 A1 | 6/2003 |
| JP | 2005049675 A | 2/2005 |
| WO | WO 92/16880 A1 | 10/1992 |

* cited by examiner

*Primary Examiner*—Stephone B. Allen
*Assistant Examiner*—Jennifer L. Doak
(74) *Attorney, Agent, or Firm*—Sughrue Mion, PLLC

(57) ABSTRACT

The invention relates to a security-conscious hologram which can apply a sufficient three-dimensional appearance to a reconstructed image in both its vertical and horizontal directions, and which is difficult to illegally copy and easily told from any illegal copy forged from it, and a holographic process of recording it. The hologram H2 is of a combined reflection and volume type, wherein a subject image P is recorded, and minute reflection images F and O' from a light source are recorded at least in front of, or in the rear of, the subject image P, both in a reconstructible fashion, and a viewing position E is moved along a hologram surface, so that the subject image P and the minute reflection images F and O' are viewable at varied relative positions.

11 Claims, 9 Drawing Sheets

FIG. 4
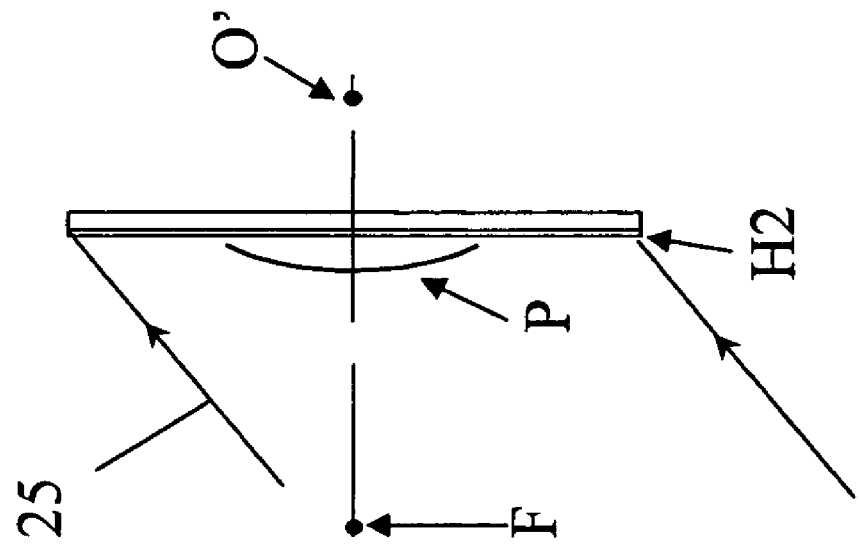
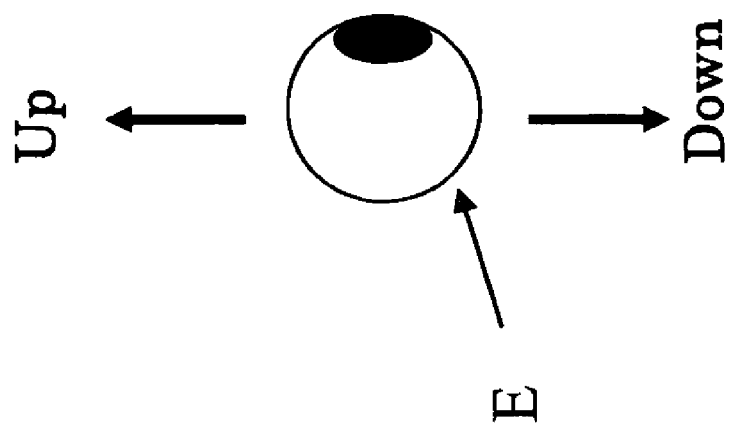

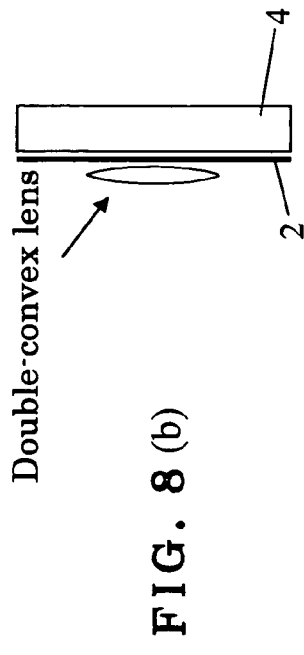
FIG. 8(a) Plano-convex lens
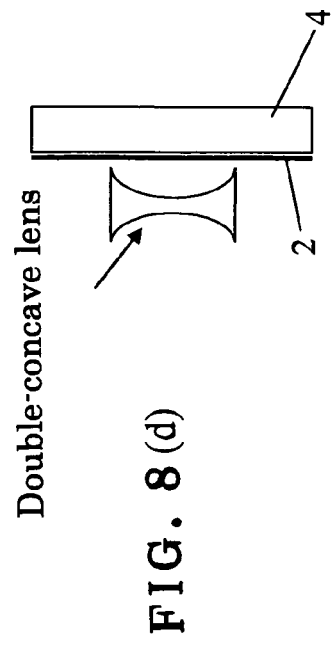
FIG. 8(b) Double-convex lens
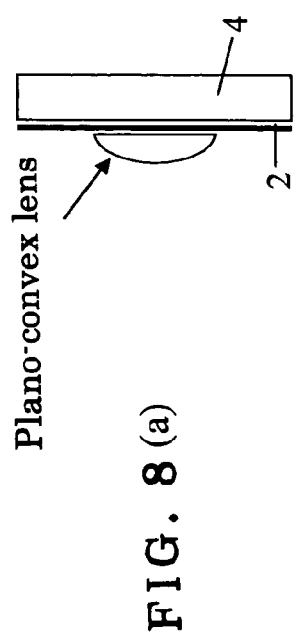
FIG. 8(c) Plano-concave lens
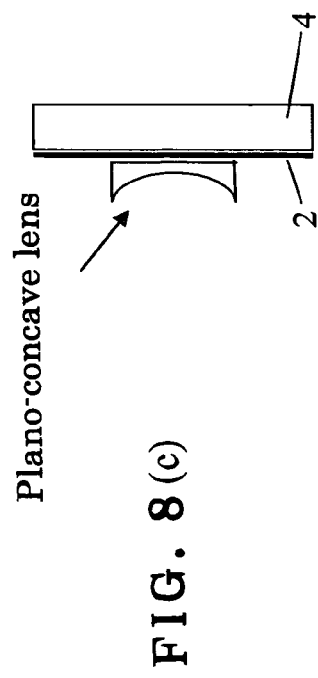
FIG. 8(d) Double-concave lens
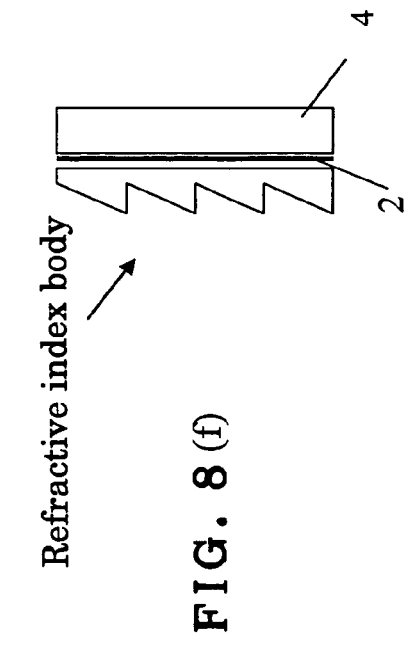
FIG. 8(e) Refractive index body
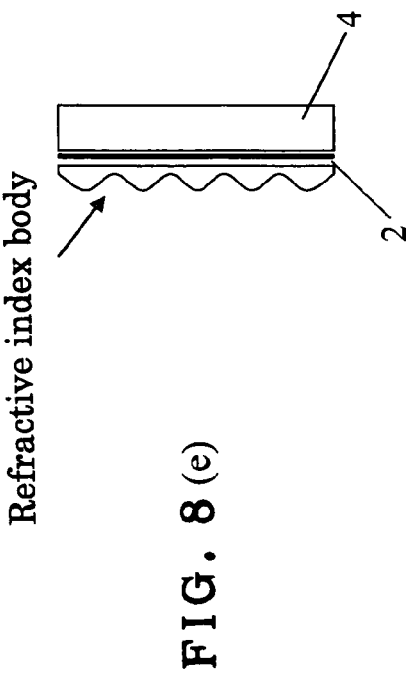
FIG. 8(f) Refractive index body

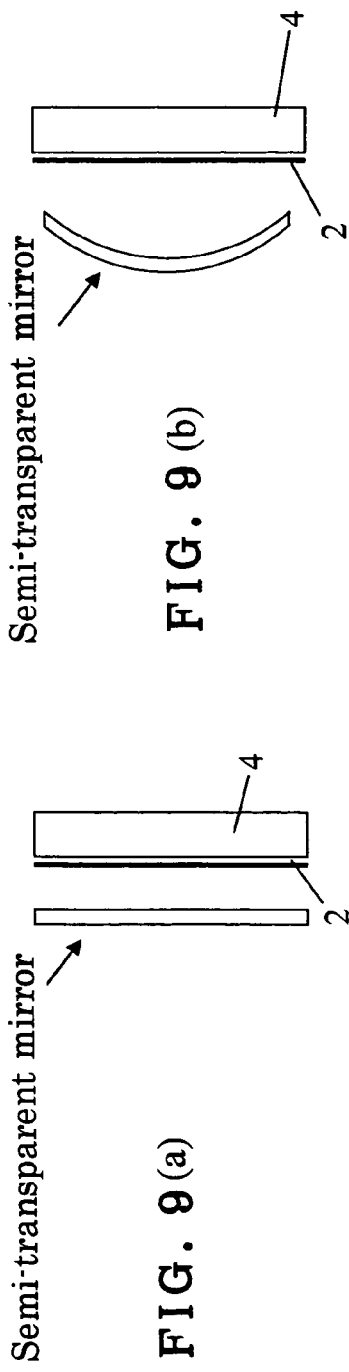
FIG. 9(a)
FIG. 9(b)
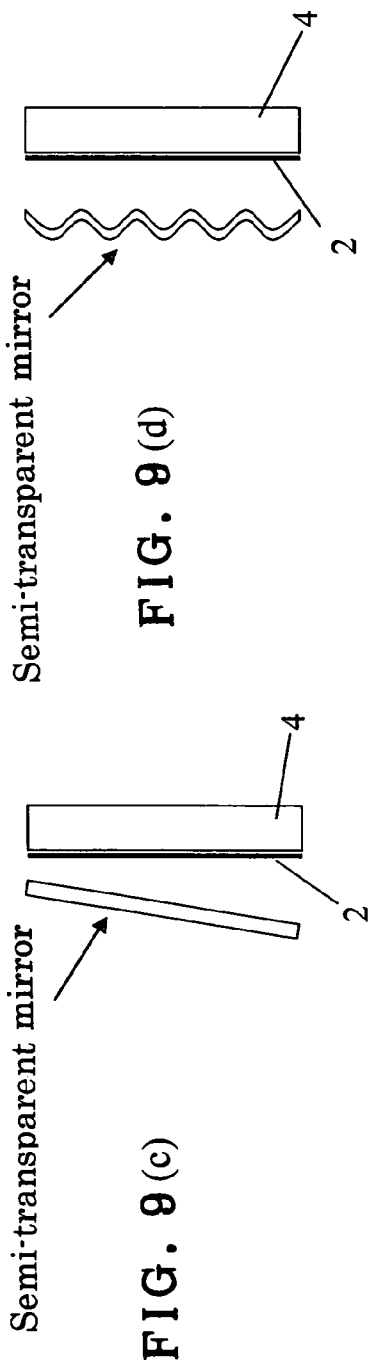
FIG. 9(c)
FIG. 9(d)
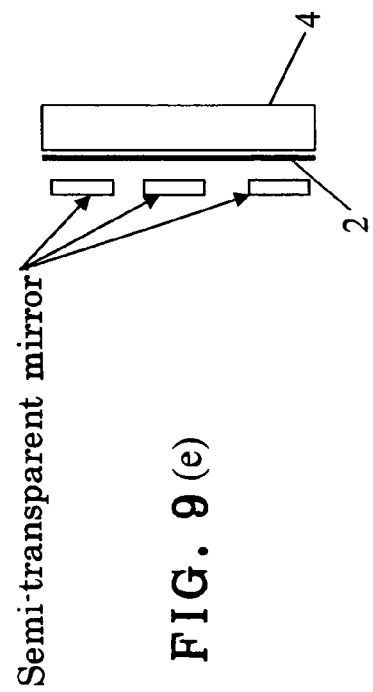
FIG. 9(e)

THREE-DIMENSIONAL HOLOGRAM PROCESS WITH OVERT ANTI-COUNTERFEIT SECURITY USING FIRST OBJECT LIGHT, SECOND OBJECT LIGHT, AND REFERENCE LIGHT

BACKGROUND OF THE INVENTION

The present invention relates generally to a hologram and its holographic process, and more particularly to a security-conscious hologram that is much less vulnerable to illegal copying and can be easily told from any illegal copy forged from it, and a holographic process for the same.

Holograms, thanks to their aesthetic attributes, have been on the market also for prevention of illegal copying by visual authentication. Holograms appearing on the market, for the most part, have been of the embossed type fabricated with a variety of designs capable of visual authentication. However, such embossed holograms are now easier to fabricate, on the way out for prevention of illegal copying.

In this conjunction, the embossed type hologram has been a sort of expression wherein a certain direction parallax alone is intervened, and so a three-dimensional appearance is obtained in that direction alone. As a hologram comparable to the embossed type hologram, a volume hologram has been developed, foraying into the illegal copying preventive field. For the volume hologram capable of applying a three-dimensional appearance to the reconstructed image irrespective of vertical and horizontal directions, authentication is required by making a design difference with a conventional embossed hologram. When an ordinary model is holographically recorded in the volume hologram, it is possible to apply a three-dimensional appearance to the length direction as well as to the width direction. With some volume holograms, however, a reconstructed image cannot be easily in sight depending on object's solidity, light source, and design.

So far, a volume hologram for prevention of illegal copying with ordinarily invisible fine patterns three-dimensionally recorded in it has been known from Patent Publication 1 as an example. Even with this, however, it would be not easy to ensure such a sufficient three-dimensional appearance as mentioned above.

Patent Publication 1: JP-A 11-24538

SUMMARY OF THE INVENTION

Such being the prior art, the present invention has for its object the provision of a security-conscious hologram which ensures to apply a sufficient three-dimensional appearance to an reconstructed image in both its vertical and horizontal directions, and which is difficult to illegally copy and easily told from any illegal copy forged from it, and its holographic process.

According to the present invention, this object is achievable by the provision of a hologram comprising a hologram of a reflection and volume type, characterized in that a subject image is recorded, and a minute reflection image of a light source is recorded at least in front of, or in the rear of, said subject image, both in a reconstructible fashion, and a viewing position is moved along a hologram surface whereby said subject image and said minute reflection image are viewed at varied relative positions.

In a preferable embodiment of the invention, said subject image comprises a partially distorted image. For instance, said subject image may comprise a character pattern, a part of which may comprise a distorted character pattern portion. In this case, said distorted character pattern portion of said subject image and other distortion-free character pattern portion are in inverse contrast.

In one embodiment of the invention, minute reflection images may be recorded both in front of and in the rear of said subject image in a reconstructible fashion, and said front minute reflection image and said rear minute reflection image may be reflection images with respect to the same light source.

In another preferable embodiment of the invention, minute reflection images may be recorded both in front of and in the rear of said subject image in a reconstructible fashion, and the amount of a change in the relative position of at least one of the minute reflection images with respect to the said subject image is greater than ½ of the diameter of said subject image.

The present invention also provides a holographic process of recording a hologram, characterized in that a refractive index object is located on a hologram recording side of a subject, and first object light coming out said subject through said refractive index object and second object light comprising at least one of light reflected at an incidence side surface of said refractive index object upon illumination of said refractive index object with illumination light from the hologram recording side and light reflected at an output side surface of said refractive index object upon refraction at the incidence side surface of said refractive index object are entered in a hologram recording material located on the hologram recording side of said subject while, at the same time, reference light is entered in said hologram recording material, for interference and hologram recording.

Further, the present invention provides a holographic process of recording a hologram, characterized in that a semi-transmitting reflective surface is located on a hologram recording side of a subject, and first object light coming out of said subject through said semi-transmitting reflective surface and second object light reflected at said semi-transmitting reflective surface upon illumination of said semi-transmitting reflective surface with illumination light from the hologram recording side are entered in a hologram recording material located on the hologram recording side of said subject while, at the same time, reference light is entered in said hologram recording material, for interference and hologram recording.

In the above two holographic processes, said illumination light to be directed from the hologram recording side to said refractive index object or said semi-transmitting reflective surface may be directed thereto from the front of said hologram recording material upon transmitting through said hologram recording material.

Preferably in that case, said illumination light to be directed to said refractive index object or said semi-transmitting reflective surface converges near a position at which said illumination light transmits through said hologram recording material.

It is also preferable that at least one of the incidence side surface and output side surface of said refractive index object comprises a curved or bent surface other than a plane.

Preferably in that case, said refractive index object comprises a plano-convex positive lens having a convex surface on its incidence side and a plane surface on its output side, which, for hologram recording, is located in such a way as to satisfy at least one of the following conditions (1) and (2):

$$\tan^{-1}\{(H-2R)/4L\} \leq \theta_1 \leq \tan^{-1}\{(2H-R)/2L\} \quad (1)$$

$$\tan^{-1}\{(H+2R)/4L\} \leq \theta_2 \leq \tan^{-1}\{(2H+R)/2L\} \quad (2)$$

where $\theta_1$ is the angle of incidence on said hologram recording material of light occurring from reflection of illumination light at the outer peripheral end of the incidence side convex surface of said plano-convex positive lens, $\theta_2$ is the angle of incidence on said hologram recording material of light occurring from refraction of illumination light at the entrance convex surface of said plano-convex positive lens and reflection of illumination light at the outer peripheral end of the output side plane of the plano-convex positive lens, L is the distance from said hologram recording material to the subject, H is the size of said hologram recording material, and R is the diameter of said plano-convex positive lens.

It is also preferable that said semi-transmitting reflective surface comprises any of a plane, a curved surface, a bent surface or a discrete surface.

According to the holographic process of the invention, said reference light is entered in the hologram recording material from the same side for said first object light and said second object light to record the first hologram therein, and reconstructing illumination light is entered in said first hologram to generate diffracted light while, at the same time, another reference light is entered in a volume hologram recording material located at a position of incidence of said diffracted light for interference, thereby recording the second hologram therein. In this way, the hologram of the invention is obtainable.

The present invention also encompasses a hologram recorded by the foregoing holographic processes.

In the hologram of the invention, a subject image is recorded, and a minute reflection image of a light source is recorded at least in front of, or in the rear of, said subject image, both in a reconstructible fashion, and a viewing position is moved along a hologram surface whereby said subject image and said minute reflection image are viewed at varied relative positions. The three-dimensional appearance of the subject image including the degree of transformation is combined with the relative position, direction of movement, and number of the minute reflection image simultaneously recorded in the hologram, making illegal copying much more difficult and determination of whether that hologram is genuine or an illegal copy much easier.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 4 is illustrative of an image reconstructed from the second hologram.

FIG. 5 is illustrative of an exemplary character pattern, its modifications, and its transformed images.

FIG. 8 is illustrative of exemplary refractive index bodies located in front of a subject.

FIG. 9 is illustrative of exemplary semi-transparent mirrors located in front of the subject.

DESCRIPTION OF THE PREFERRED EMBODIMENTS

The holograms and holographic processes of the present invention are now explained with reference to the accompanying drawings.

First of all, the hologram of the invention is explained in order of holographic process steps. The hologram of the invention is holographically recorded at two steps.

Figure 1:
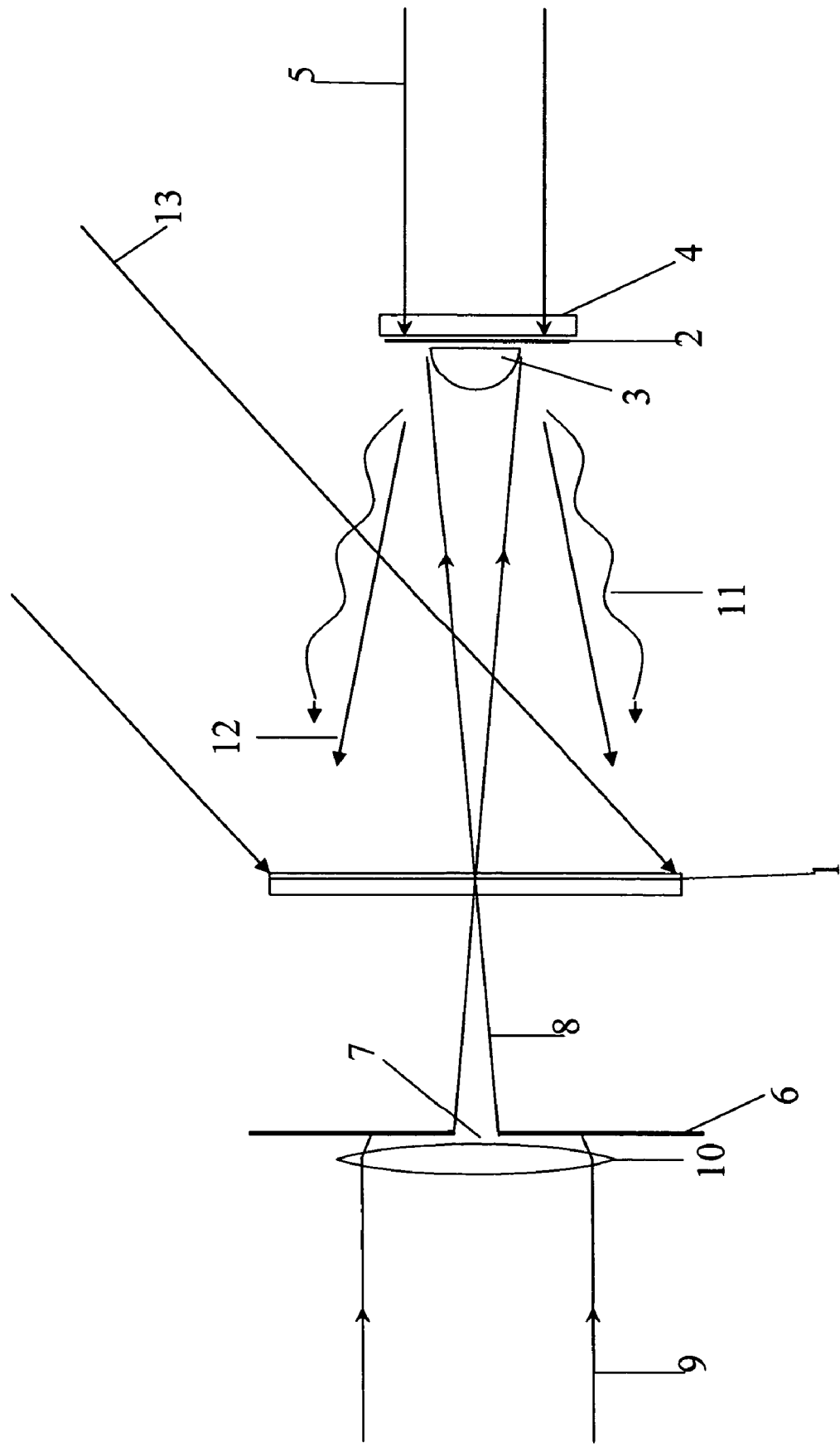
FIG. 1 is an optical path representation illustrative of one example of the first step of the holographic process according to the invention.

FIG. 1 is an optical path representation illustrative of one example of the first step of the holographic process according to the invention. A planar transmission type subject 2 is located facing one side (the right side of FIG. 1) of a first hologram recording material 1 such as a photopolymer. An example of the subject 2 will be described later. And then, a lens 3 is located on the side of the subject 2 facing the recording material 1. The lens 3 here is a plano-convex positive lens with its planar side located in contact with, or slightly spaced away from, the subject 2. A diffuser 4 is positioned in contact with the side of the subject 2 that faces away from the lens 3. Then, as the transmission type subject 2 is illuminated with object illumination light 5 from the side of this diffuser 4, diffused light transmitting through the transmission type subject 2 goes through the lens 3 located in front of it, forming a virtual image of the subject 2. Then, first object light 11 propagating as if it came out of that virtual image is incident on one side of the first hologram recording material 1.

On the other hand, a mask 6 having a minute aperture 7 is located facing the other side (the left side of FIG. 1) of the first hologram material 1. As the second object illumination light 9 is directed to the mask through a positive lens 10 substantially from the front facing away from the recording material 1, light 8 transmitting through the aperture 7 in the mask 6 once converges, transmitting through the recording material 1 located near its point of convergence and incident, as divergent light this time, on the lens 3, where a part of the illumination light reflects (Fresnel reflection) off the convex front surface and planar back surface, becoming the second object light 12 to be incident on one side of the first hologram recording material 1.

Here, reference light 13 is obliquely entered, simultaneously with the first object light 11 and the second object light 12, in the first hologram recording material 1 from the same side as the incidence side for the first object light 11 and the second object light 12 for interference. Finally, a first hologram H1 is recorded by development in the first hologram recording material 1.

Figure 2:
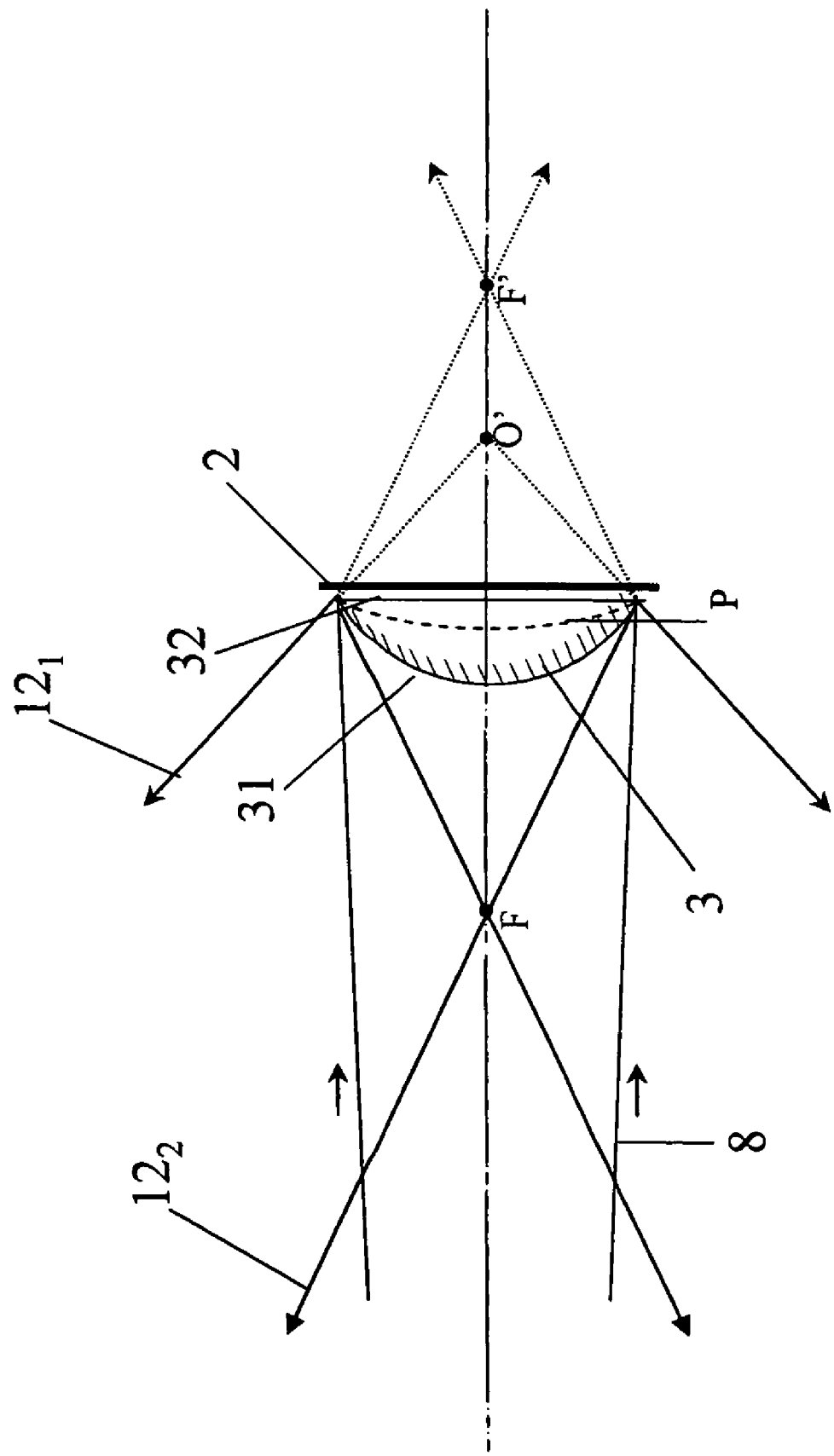
FIG. 2 is illustrative of an object image that occurs upon irradiation with the first object illumination light and the second object illumination light.

An image recorded in the hologram H1 in such an arrangement is now explained. FIG. 2 is illustrative of an object image that occurs upon such illumination by the first object light 5 and the second object light 9 as described above. The diffused light transmitting through the planar transmission type subject 2 passes through the lens 3 to form a virtual image P of the subject 2, which image is in a convex shape as viewed from the side of the recording material 1. The first object light 11 of FIG. 1 enters the first hologram recording material 1 just as light coming out of this virtual image P.

Meanwhile, the light 8, which transmits through the aperture 7 in the mask 6, once converges and then diverges, is incident on the convex surface 31 of the lens 3 on the side of the recording material 1, where a part of that light is subjected to Fresnel reflection. The resulting reflected light $12_1$ enters the first hologram recording material 1 just as light diverging from a point O' in the rear of the convex surface 31.

Further, the portion of the light 8 transmitting through the convex surface 31 of the lens 3 is refracted at that surface 31, traveling in such a way as to converge on another point F' behind the convex surface 31. Then, the light is incident on the plane 32 of the lens 3 on the side of the subject 2, traveling toward a point F that is an image of the point F' and on the side of the lens 3 facing the recording material 1, and arriving at that point F, after which it enters the first hologram material 1 as light $12_2$ diverging from the point F.

The reflected light $12_1$ traveling in such a way as to diverge from the point O' and the reflected light $12_2$ diverging from the point F merge together into the second object light 12, which then enters the first hologram recording layer 1.

As can be seen from the foregoing explanation, the object image holographically recorded in the hologram H1 by interference with the reference light 13 comprises the virtual image P of the subject 2 by the lens 3 (FIG. 2), the point of divergence O' behind it and the point of divergence F in front of it.

Figure 3:
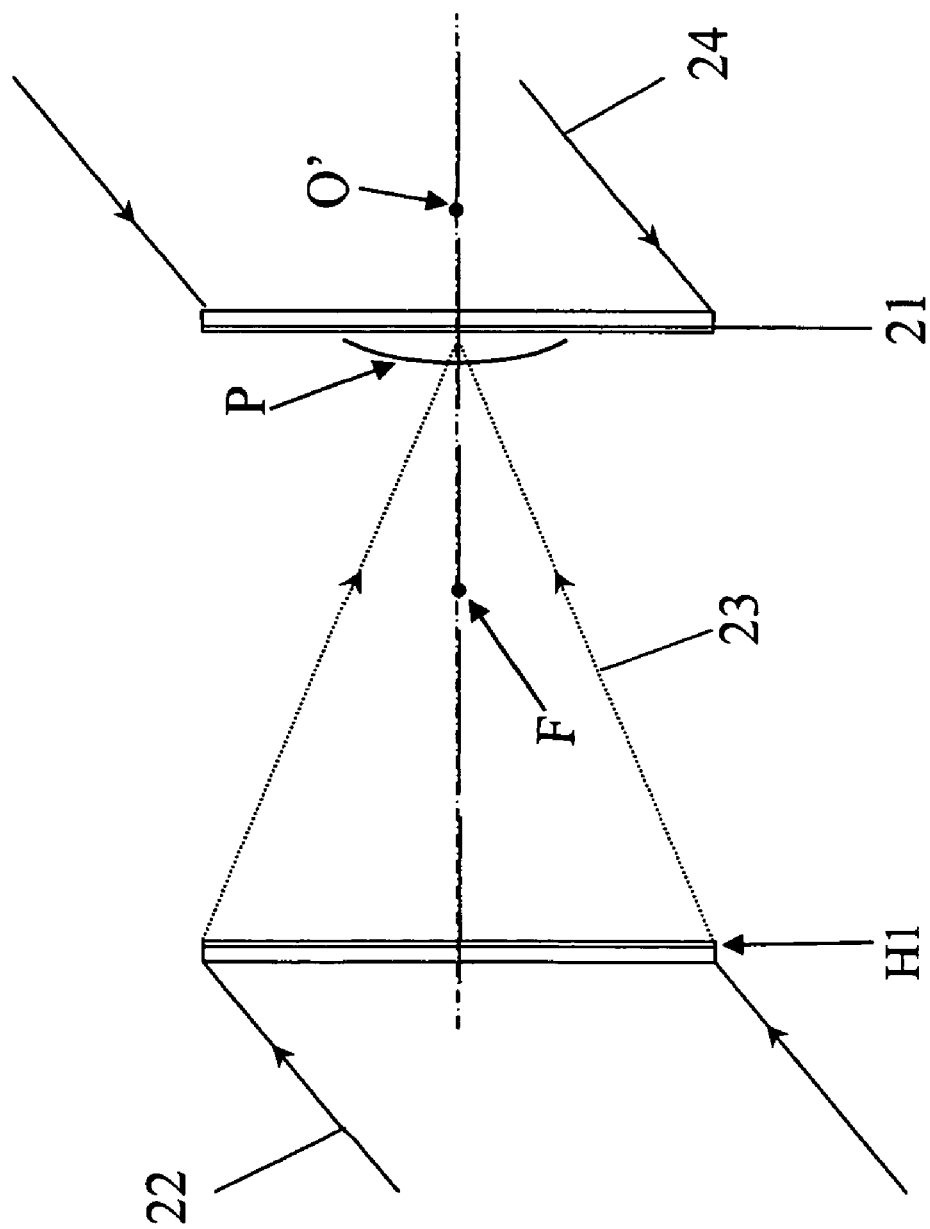
FIG. 3 is illustrative of an arrangement for recording a reflection hologram at the second step.

The first hologram H1 recorded in the first hologram recording material 1 as mentioned above is then used to record a reflection hologram H2 at the second step. A specific arrangement to this end is shown in FIG. 3. The first hologram H1(1) holographically recorded in the arrangement of FIG. 1 is located at the position of FIG. 1, and reconstructing illumination light 22 traveling oppositely to the reference light 13 for holographic recording is entered in the first hologram H1(1) from the side that faces away from the incidence side for the reference light 13 for back surface recording. Thereupon, forwardly diffracted light 23 yields reconstruction real images of the virtual image P of the subject 2, the point of convergence F defined by refraction at the front convex surface 31 of the lens 3 and reflection at the back plane 32 thereof and the point of divergence O' defined by reflection at the convex surface 31 (such reconstruction images, too, are shown by the same P, F, O') are reconstructed while the spatial arrangement for recording is kept intact. A second hologram recording material 21 comprising a volume hologram recording material such as a photopolymer is placed near such reconstructed images (near the virtual image P of the subject 2 in FIG. 3), and reference light 24 is simultaneously entered in the second hologram recording material 21 this time from the side that faces away from the incidence side for the diffracted light 23 for interference and development, thereby recording the second hologram H2 in the second hologram recording material 21. This second hologram H2 becomes the security-conscious hologram of the invention. Alternatively, the inventive security-conscious hologram having similar properties may also be obtained by holographic replication of the second hologram H2. Note here that this hologram is a reflection hologram.

FIG. 4 is illustrative of an image reconstructed from the thus obtained second hologram H2. As reconstructing illumination light 25 traveling oppositely to the reference light 24 for holographic recording is entered in the second hologram H2(21) from the side that faces away from the incidence side for the reference light 24, a transformed image P of the subject 2 by the lens 3, the point F defined by refraction at the front surface 31 of the lens 3 and reflection at the back surface 32 and the point O' defined by refraction at the front surface 31 of the lens 3 are reconstructed as real or virtual images (the image P and the point F reconstructed as real images and the point O' as a virtual image in FIG. 4), while the spatial arrangement for holographic recording is kept intact. Therefore, as the eye E of the viewer is positioned on the incidence side of the reconstructing illumination light 25, it allows the viewer to view the transformed image P, the point F and the point O' while the stereoscopic arrangement for holographic recording is maintained. To an ordinary viewer, however, the points F and O' are unnoticeable or appear to be only a reflection of the surrounding light source image; in any event, they are not that obtrusive.

On the other hand, consider now that the transmission type subject 2 is such a character pattern as shown in FIG. 5(*a*). With the lens 3 of positive power placed on that, even when the transformed image P is seen as a plane image, there is a character pattern which, as depicted in FIG. 5(*b*), is distorted at only a site with the lens 3 placed on it, making the image P convex toward the eye E side, and thereby applying a sufficient three-dimensional appearance to the image P in both vertical and horizontal directions.

And then, these images F, P and O' are reconstructed in the order depicted in FIG. 4 while they are lined up in the depth direction. Consider now the intermediate transformed image P of the subject 2 as a reference. As the viewer moves his eye E relatively up (indicated by an "up" arrow in FIG. 4), it causes the image F to move down and the image O' to move up. Conversely, as the viewer moves his eye E relatively down (indicated by a "down" arrow in FIG. 4), it allows the image F to move up and the image O' to move down.

Thus, given the three-dimensional appearance of the subject image P including the degree of transformation of the character pattern and the relative positions and relative movement directions of the images F and O' simultaneously recorded in the hologram, whether that hologram is a genuine one or an illegal copy can be easily determined.

Next, consider the range wherein the images O' and F are seen when the viewer moves his eye E relatively to the second hologram H2, and the range of movement of the images O' and F with respect to the transformed image P.

Figure 6:
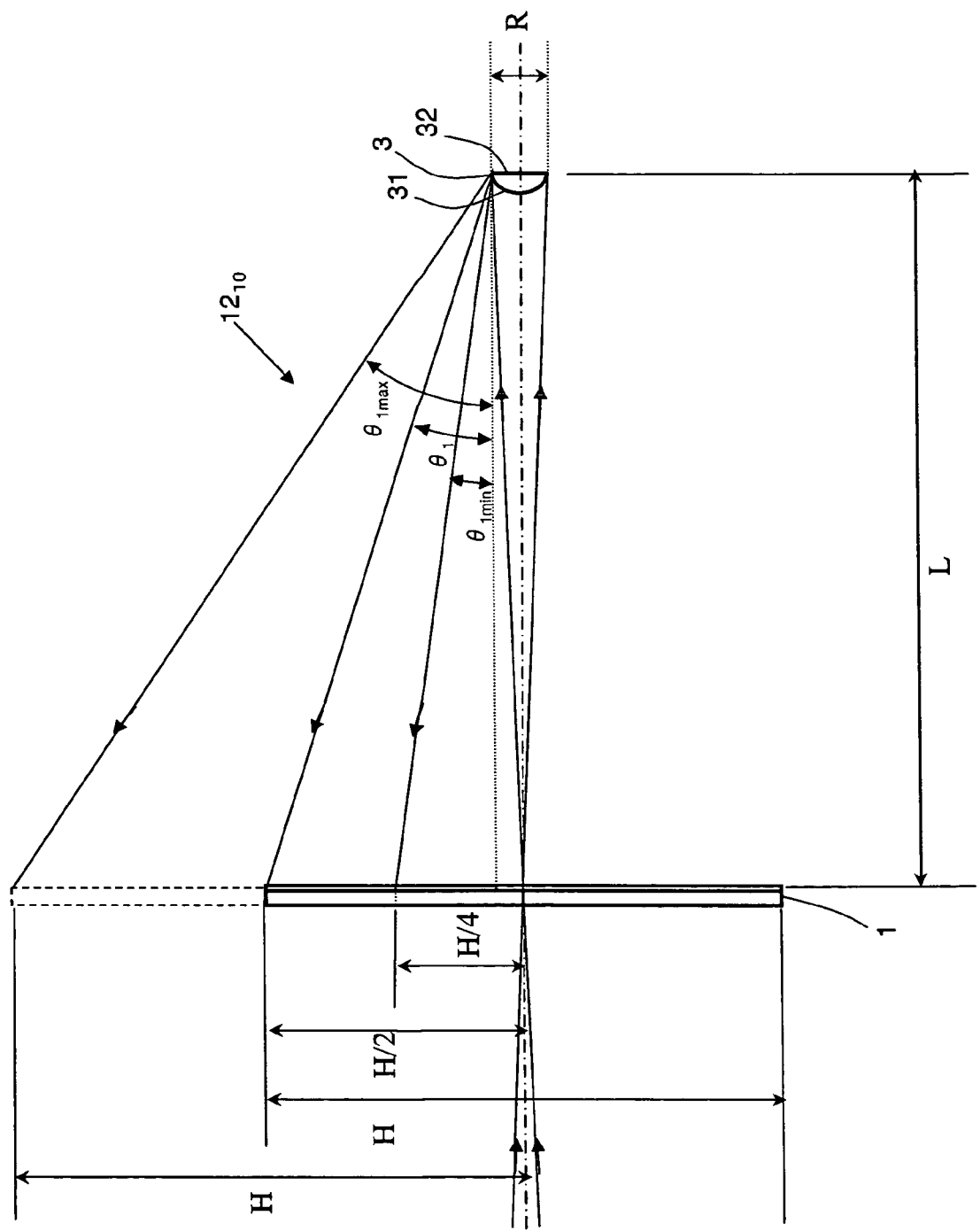
FIG. 6 is a representation of the angle range for the outermost light ray of reflected light that, when the first hologram corresponding to FIG. 1 is holographically recorded, propagates in such a way as to diverge from the point of divergence O'.

FIG. 6 is a representation of the angle range for the outermost light ray $12_{10}$ of light $12_1$ reflected at the convex surface 31 of the lens 3, which travels in such a way as to diverge out of the point of divergence O' in the holographic process of the first hologram H1 corresponding to FIG. 1. Primarily by setting the radius of curvature of the convex surface 31, the minimum $\theta_{1min}$ to the maximum $\theta_{1max}$ incidence angle range with respect to the first hologram recording material 1 is determined. Here, let L be the distance from the first hologram recording material 1 to the subject 2, H be the size of the first hologram recording material 1, R be the diameter of the lens 3, and $\theta_1$ be the angle of incidence on the first hologram recording material 1 of the light $12_{10}$ reflected at the outer peripheral end of the convex surface 31 of the lens 3. Then, there are $$\theta_{1min} = \tan^{-1}\{(H-2R)/4L\}$$

$$\theta_{1max} = \tan^{-1}\{(2H-R)/2L\}$$

The angle of incidence on the first hologram recording material 1 of the light $12_{10}$ reflected at the outer peripheral end of the convex surface 31 of the lens 3 is set at $\theta_1$ in such a way as to satisfy $\theta_{1min} \leq \theta_1 \leq \theta_{1max}$, that is, $$\tan^{-1}\{(H-2R)/4L\} \leq \theta_1 \leq \tan^{-1}\{(2H-R)/2L\} \quad (1)$$

so that the visibility of the movement of the image O' in the finally obtained second hologram H2 can be gained. That is, the lower limit $\theta_{1min}$ to $\theta_1$ implies that when the viewer moves his eye E relatively up or down, as depicted in FIG. 4, the range wherein the image O' that moves with respect to the transformed image P of the subject 2 in the same direction can be viewed is limited to the range of ±H/4 from the center of the original first hologram H1(1); as the limits ±H/4 are reached, the image O' arrives at the outer periphery of the transformed image P; and as the viewer moves his eye E beyond those limits, the image O' is no longer in sight. Likewise, the upper $\theta_{1max}$ to $\theta_1$ implies that when the viewer moves his eye E up or down to the outer periphery of the original first hologram H1(1), the image O' reaches a position of nearly ½ from the center of the transformed image P; and as the viewer moves his eye E beyond the outer periphery of the original first hologram H1(1), the image O' is no longer in sight because the reflected light $12_1$ is not recorded in the second hologram H2.

Thus, when $\theta_1$ is near the lower limit of $\theta_{1min} \leq \theta_1 \leq \theta_{1max}$, the image O' is allowed to move within the range of the transformed image P; however, the range wherein the viewer can move his eye E to view the image O' is limited to about ±H/4 from the center of the original first hologram H1(1). Likewise, at near the upper limit, the range wherein the viewer can move his eye E to view the image O' comes within the range of the original first hologram H1(1); however, the range of relative movement of the image O' is limited to within the range of about ½ of the diameter of the transformed image P from its center, where the speed of relative movement is slow.

And of course, if $\theta_1$ satisfies $$\theta_1 = \tan^{-1}\{(H-R)/2L\}$$

so that the reflected light $12_{10}$ can be incident on the outer periphery end of the fist hologram recording material 1, then the image O' can move relatively within the range of the transformed image P and the range wherein the viewer can move his eye E to view the image O' comes within the range of the original first hologram H1(1), where there is the highest visibility obtained.

Figure 7:
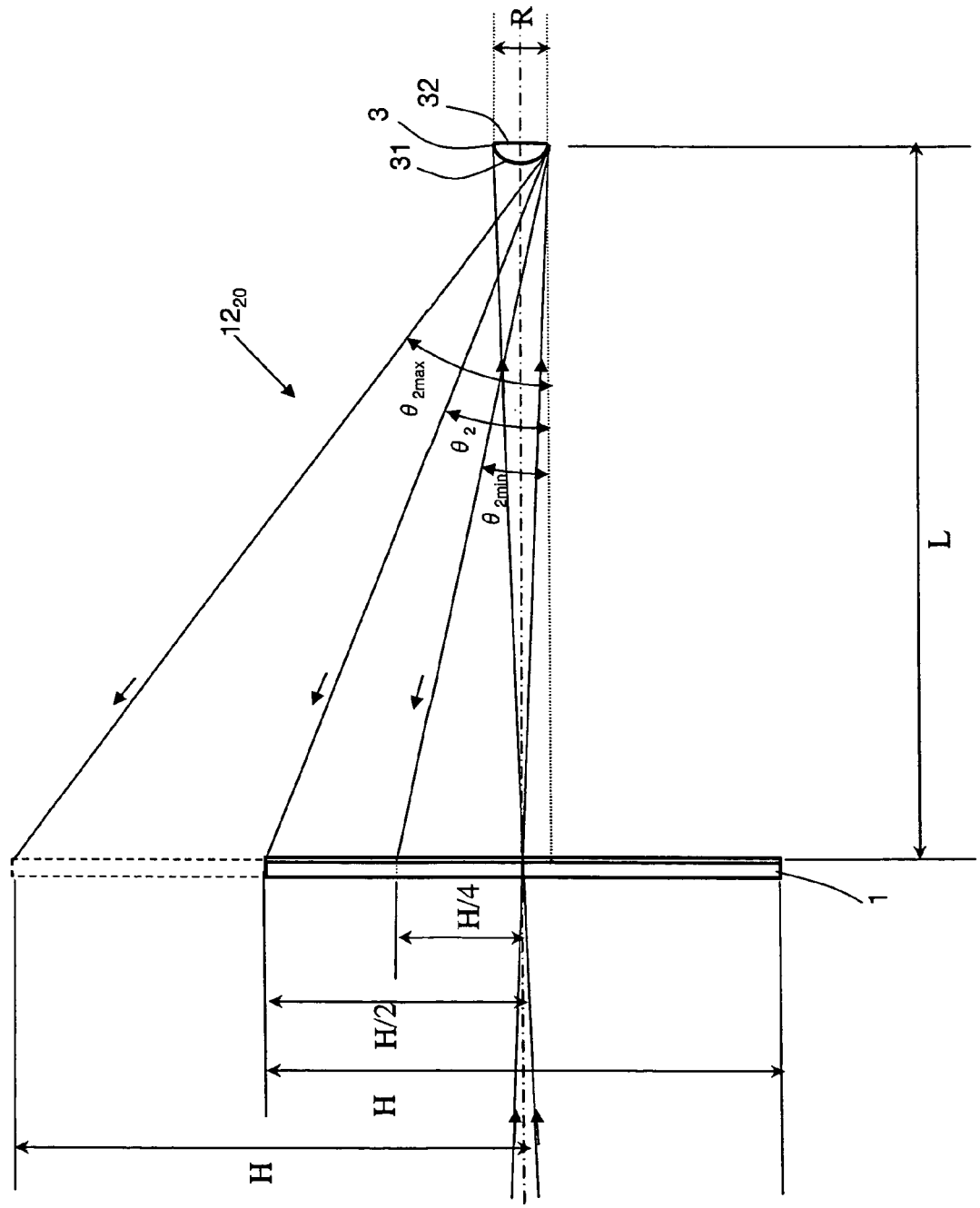
FIG. 7 is a representation of the angle range for the outermost light ray of reflected light that, when the first hologram corresponding to FIG. 1 is holographically recorded, propagates in such a way as to diverge from the point of divergence F.

FIG. 7 is a representation of the angle range for the outermost light ray $12_{20}$ of light $12_2$ reflected at the convex surface 31 of the lens 3 upon refraction through the convex surface 31 of the lens 3, which travels in such a way as to diverge out of the point of divergence F in the holographic process of the first hologram H1 corresponding to FIG. 1. Primarily by setting the radius of curvature of the convex surface 31 and the refractive index of the lens 3, the minimum $\theta_{2min}$ to the maximum $\theta_{2max}$ incidence angle range with respect to the first hologram recording material 1 is determined. L, H and R here have the same definitions as given with reference to FIG. 6, and $\theta_2$ is the angle of incidence on the first hologram recording material 1 of the light $12_{20}$ reflected at the outer periphery end of the plane 32 of the lens 3. Then, there are $$\theta_{2min} = \tan^{-1}\{(H+2R)/4L\}$$

$$\theta_{2max} = \tan^{-1}\{(2H+R)/2L\}$$

The angle of incidence on the first hologram recording material 1 of the light $12_2$ reflected at the outer peripheral end of the convex surface 31 of the lens 3 is set at $\theta_2$ in such a way as to satisfy $\theta_{2min} \leq \theta_2 \leq \theta_{2max}$, that is, $$\tan^{-1}\{(H+2R)/4L\} \leq \theta_2 \leq \tan^{-1}\{(2H+R)/2L\} \quad (2)$$

so that the visibility of movement of the image F in the finally obtained second hologram H2 can be gained. That is, as is the case with FIG. 6, the lower limit $\theta_{2min}$ to $\theta_2$ implies that when the viewer moves his eye E relatively up or down, as depicted in FIG. 4, the range wherein the image F that moves with respect to the transformed image P of the subject 2 in the opposite direction can be viewed is limited to the range of ±H/4 from the center of the original first hologram H1(1); as the limits ±H/4 are reached, the image F arrives at the outer periphery of the transformed image P; and as the viewer moves his eye E beyond those limits, the image F is no longer in sight. Likewise, the upper $\theta_{2max}$ to $\theta_2$ implies that when the viewer moves his eye E up or down to the outer periphery of the original first hologram H1(1), the image F reaches a position of nearly, ½ from the center of the transformed image P; and as the viewer moves his eye E beyond the outer periphery of the original first hologram H1(1), the image F is no longer in sight because the reflected light $12_2$ is not recorded in the second hologram H2.

Thus, when $\theta_2$ is near the lower limit of $\theta_{2min} \leq \theta_2 \leq \theta_{2max}$, the image F is allowed to move within the range of the transformed image P; however, the range wherein the viewer can move his eye E to view the image F is limited to about ±H/4 from the center of the original first hologram H1(1). Likewise, at near the upper limit, the range wherein the viewer can move his eye E to view the image F comes within the range of the original first hologram H1(1); however, the range of relative movement of the image F is limited to within the range of about ½ of the diameter of the transformed image P from its center, where the speed of relative movement is slow.

And of course, if $\theta_2$ satisfies $$\theta_2 = \tan^{-1}\{(H+R)/2L\}$$

so that the reflected light $12_{20}$ can be incident on the outer periphery end of the fist hologram recording material 1, then the image F can move relatively within the range of the transformed image P and the range wherein the viewer can move his eye E to view the image O' comes within the range of the original first hologram H1(1), where there is the highest visibility obtained.

Incidentally, it is understood that because the hologram H2 of the invention is of the combined volume and reflection type, it can indeed be fully reconstructed and viewed with white light in ordinary environments without recourse to such reconstructing illumination light 25 as shown in FIG. 4.

Figures 5A, 5B, 5C, 5D, 5E:
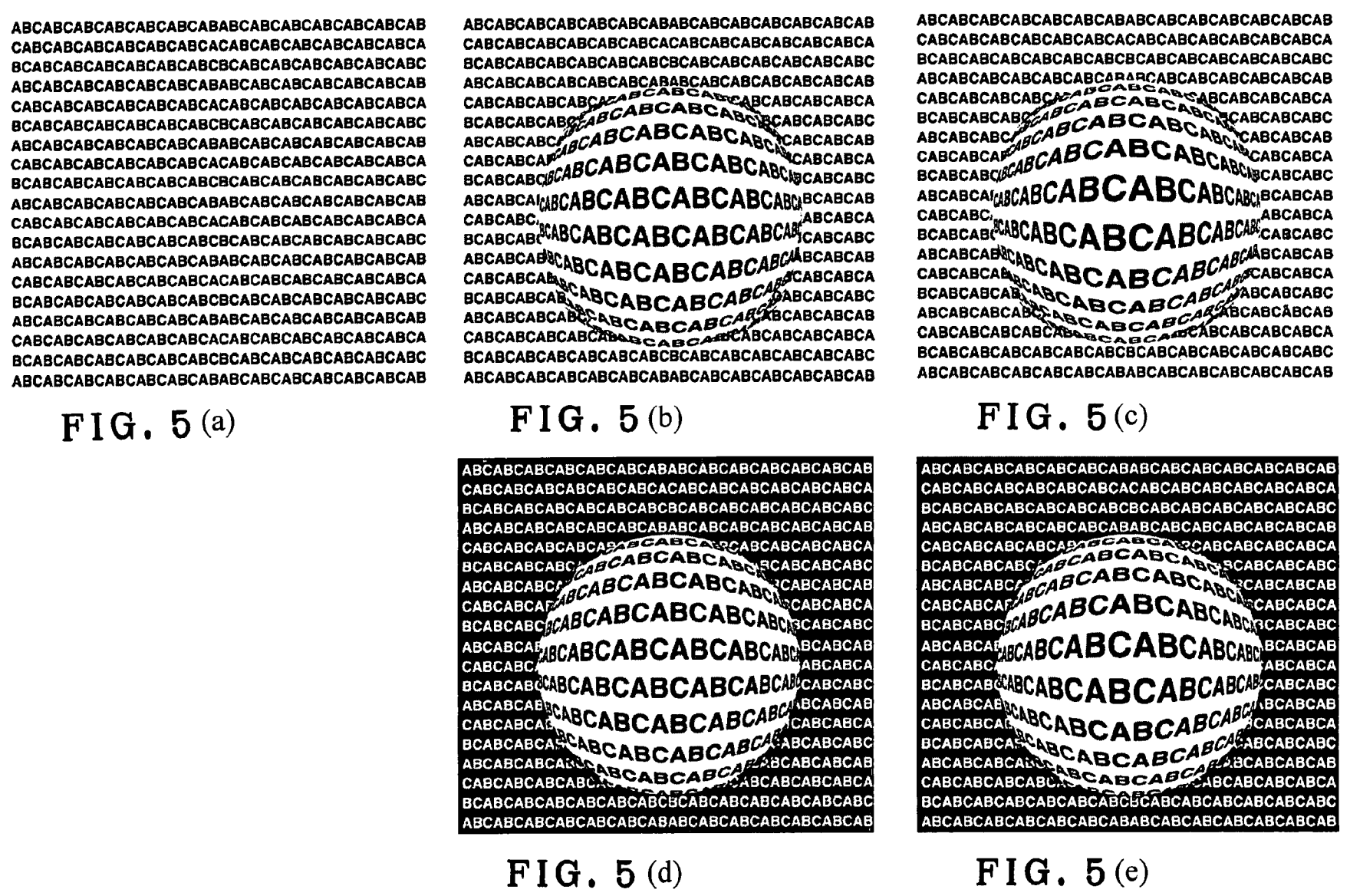

By the way, when the transmission type subject 2 is such a character pattern as shown typically in FIG. 5(a), it is preferable to previously apply such distortion as depicted in FIG. 5(b) to that transmission type subject 2, thereby giving a lot more enhancement to the degree of transformation of the transformed image P. This is because, in the transformed image P with distortion applied to it through the lens 3, the distortion of the portion of the image with the lens 3 placed on it is more enhanced, making the image P more convex toward the eye E side and, hence, applying a lot more striking three-dimensional appearance to it in both the vertical and horizontal directions.

Just as the subject 2 corresponding to FIG. 5(b) and illustrated in FIG. 5(d), the character pattern for the subject 2 may comprise a positive image deformable by the lens 3 and a negative image of opposite contrast with the lens 3 not placed on it. In the transformed image P with distortion applied to it through the lens 3, the contrast of the portion with the lens 3 placed on it is so reversed that a lot more expression can be added to the reconstructed image. In FIG. 5(d), distortion is much more enhanced and, hence, illegal copying grows more difficult.

For the transparent body which, in the holographic process of recording the first hologram H1, is located on the side of the subject 2 facing the recording material 1 to transform the image of the subject, various refractive index bodies may be used, to say nothing of the plano-concave lens (lens 3 in FIG. 1) as shown in FIG. 8(*a*). Specific examples are shown in FIGS. 8(*b*)-8(*f*). FIG. 8(*b*) shows a double-convex lens of positive power; FIG. 8(*c*) shows a plano-concave lens of negative power; and FIG. 8(*d*) shows a double-concave lens of negative power. Use may also be made of a refractive index object which, as shown in FIG. 8(*e*), has any arbitrary curved surface or surfaces (of wave shape in FIG. 8(*e*)) on one side or both sides or, as shown in FIG. 8(*f*), has a bent surface or surfaces (of toothed bent shape in FIG. 8(*f*)) on one side or both sides. These are mentioned by way of example alone but not by way of limitation.

Thus, by holographically recording the hologram of the invention while various such refractive index bodies are located in front of the subject 2, a lot more transformation can be added to the subject image P and a lot more three-dimensional appearance can be added to the reconstructed image, making illegal copying much more difficult. In addition, there are a lot more variations in the relative position, direction of movement and number of images corresponding to the images F and O' simultaneously recorded in the hologram, which make illegal copying much more difficult, and make determination of whether that hologram is a genuine one or an illegal copy much easier.

For the transparent body which, in the holographic process of recording the first hologram H1, is located on the subject 2 facing the recording material 1, semi-transparent mirrors of various surface shapes (semi-transmitting reflective surfaces) may be used, to say nothing of such a refractive index object having partially reflective front and rear surfaces as shown in FIG. 8. Note here that each is located away from the subject 2. With such a semi-transparent mirror, there is no transformation of the subject image; however, there are a lot more variations in the relative position, direction of movement, and number of images corresponding to the images F and O' simultaneously recorded in the hologram, which make illegal copying much more difficult, and make determination of whether that hologram is a genuine one or an illegal copy much easier. Exemplary such semi-transparent mirrors are shown in FIG. 9(*a*) to FIG. 9(*e*). FIG. 9(*a*) shows that a simple plane semi-transparent mirror is located parallel with the subject 2; FIG. 9(*b*) shows that a convex semi-transparent mirror of negative power is located in front of the subject 2; FIG. 9(*c*) shows that a plane semi-transparent mirror is located obliquely to the subject 2; FIG. 9(*d*) shows that a semi-transparent mirror having any arbitrary curved surface (of wave shape here) is located in front of the subject 2; and FIG. 9(*e*) shows that a semi-transparent mirror having discrete, partially reflective regions is located in front of the subject 2. These mirrors placed in front of the subject 2 are mentioned by way of example alone but not by way of limitation. Note here that the proportion of the reflectivity and transmittance of each semi-transparent mirror (semi-transmitting reflective surface) may be determined as desired.

While the hologram of the invention and the holographic process of recording it have been explained with reference to some specific embodiments, it is understood that the invention is never limited to them, and so many modifications could be possible.

What we claim is:

1. A holographic process of recording a hologram, characterized in that a refractive index object is located on a hologram recording side of a subject, and first object light coming from said subject through said refractive index object and second object light comprising at least one of light reflected at an incidence side surface of said refractive index object upon illumination of said refractive index object with illumination light from the hologram recording side and light reflected at an output side surface of said refractive index object upon refraction at the incidence side surface of said refractive index object are entered in a hologram recording material located on the hologram recording side of said subject while, at the same time, reference light is entered in said hologram recording material, for interference and hologram recording.

2. The holographic process of recording a hologram according to claim 1, characterized in that at least one of the incidence side surface and the output side surface of said refractive index object comprises a curved or bent surface other than a plane.

3. The holographic process of recording a hologram according to claim 2, characterized in that said refractive index object comprises a plano-convex positive lens having a convex surface on an incidence side and a plane surface on an output side, which, for hologram recording, is located in such a way as to satisfy at least one of the following conditions (1) and (2):

$$\tan^{-1}\{(H-2R)/4L\} \leq \theta_1 \leq \tan^{-1}\{(2H-R)/2L\} \quad (1)$$

$$\tan^{-1}\{(H+2R)/4L\} \leq \theta_2 \leq \tan^{-1}\{(2H+R)/2L\} \quad (2)$$

where $\theta_1$ is an angle of incidence on said hologram recording material of light occurring from reflection of illumination light at an outer peripheral end of the incidence side convex surface of said piano-convex positive lens, $\theta_2$ is an angle of incidence on said hologram recording material of light occurring from refraction of illumination light at the entrance convex surface of said piano-convex positive lens and reflection of illumination light at an outer peripheral end of the output side plane of the piano-convex positive lens, L is a distance from said hologram recording material to the subject, H is a size of said hologram recording material, and R is a diameter of said piano-convex positive lens.

4. The holographic process of recording a hologram according to claim 1, wherein a hologram recorded by the holographic process comprises an image of the subject and the refractive index object.

5. A holographic process of recording a hologram, characterized in that a semi-transmitting reflective surface is located on a hologram recording side of a subject, and first object light coming out of said subject through said semi-transmitting reflective surface and second object light reflected at said semi-transmitting reflective surface upon illumination of said semi-transmitting reflective surface with illumination light from the hologram recording side are entered in a hologram recording material located on the hologram recording side of said subject while, at the same time, reference light is entered in said hologram recording material, for interference and hologram recording.

6. A holographic process of recording a hologram according to claim 5, characterized in that said semi-transmitting reflective surface comprises any of a plane, a curved surface, a bent surface or a discrete surface.

7. The holographic process of recording a hologram according to claim 5, wherein a hologram recorded by the holographic process comprises an image of the subject and the semi-transmitting reflective surface.

8. The holographic process of recording a hologram according to claim 1 or 5, characterized in that said illumination light to be directed from the hologram recording side to said refractive index object or said semi-transmitting reflective surface is directed thereto from the front of said hologram recording material upon transmitting through said hologram recording material.

9. The holographic process of recording a hologram according to claim 8, characterized in that said illumination light to be directed from the hologram recording side to said refractive index object or said semi-transmitting reflective surface converges near a position at which said illumination light transmits through said hologram recording material.

10. The holographic process of recording a hologram according to claim 1 or 5, characterized in that said reference light is entered in the hologram recording material from the same side for said first object light and said second object light to record the first hologram therein, and reconstructing illumination light is entered in said first hologram to generate diffracted light while, at the same time, another reference light is entered in a volume hologram recording material located at a position of incidence of said diffracted light for interference, thereby recording the second hologram therein.

11. A hologram, which is recorded by the holographic process of recording a hologram according to claim 1 or 5.

\* \* \* \* \*